March 13, 1945.  W. MENDIUS  2,371,457
APPARATUS FOR DETERMINING THE PROPORTIONS
OF ADMIXED IMMISCIBLE LIQUIDS
Filed Jan. 28, 1941
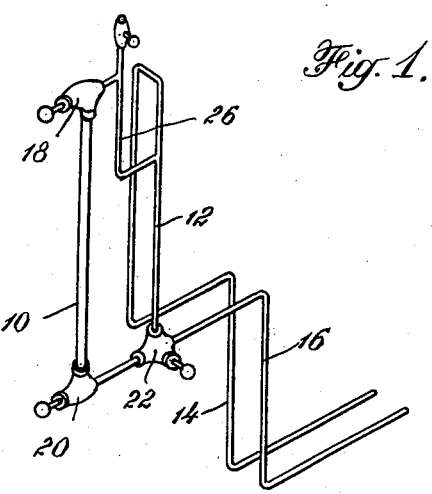
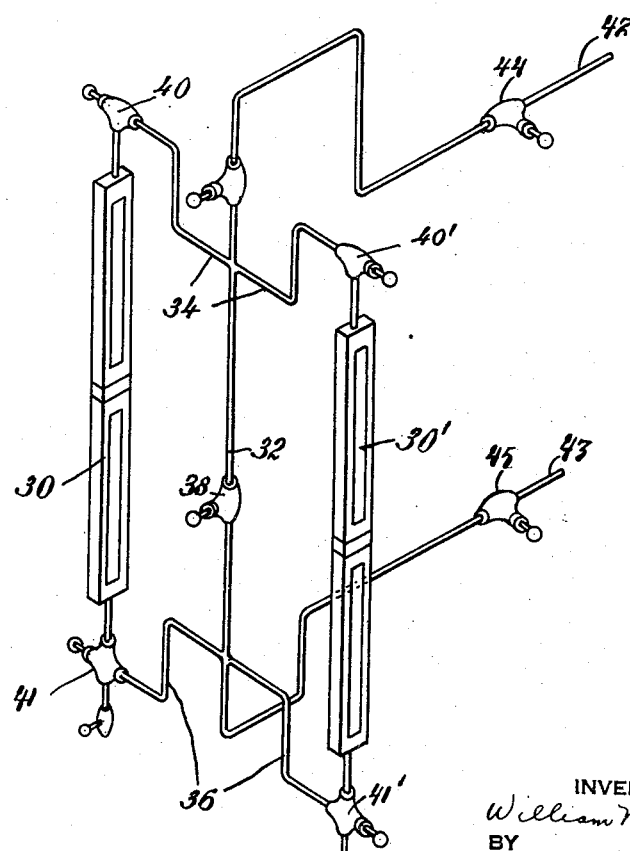
INVENTOR
William Mendius
BY
Pennie, Davis, Marvin & Edmonds
ATTORNEY Patented Mar. 13, 1945

2,371,457

UNITED STATES PATENT OFFICE 2,371,457

APPARATUS FOR DETERMINING THE PROPORTIONS OF ADMIXED IMMISCIBLE LIQUIDS

William Mendius, Munster, Ind., assignor to Sinclair Refining Company, New York, N. Y., a corporation of Maine Application January 28, 1941, Serial No. 376,285

4 Claims. (Cl. 73—32)

This invention relates to an improved gauge for determining the ratios of two immiscible liquids in emulsified or admixed condition such that, upon standing, the two liquids do not immediately separate into layers. The new gauge has important advantages for the determination of the ratio of acid to hydrocarbon in reactors in which olefins are alkylated with isobutane for the production of motor fuel by reaction in the presence of strong sulfuric acid.

In the alkylation of olefins, for example, butylene, by isobutane in the presence of strong sulfuric acid, there is usually maintained one or more bodies, or a flowing stream, of acid and liquid hydrocarbon. Among other conditions which require control is the ratio of acid to hydrocarbon, which may vary from somewhat less than 1 to considerably more than 1, but in any given operation, is usually maintained constant, if possible, as variations in this ratio will require, for optimum production, changes in other conditions of operation, such as degree of mixing, temperature, acid strength, etc. The hydrocarbon and acid, during the process, are maintained under vigorous agitation, and are present as emulsions, or, at least as an intimate mixture of the acid and the hydrocarbon, which are substantially immiscible, and thus exist as two separate phases.

It is important, in many cases, to promptly determine the ratio of acid to hydrocarbon so that it may be maintained, by appropriate adjustment of the feed, at whatever value gives the best results under the particular conditions of the operation, as to temperature, degree of mixing, acid strength, etc.

The conventional method of determining the ratio has been to provide a gauge glass through which the acid-hydrocarbon mixture is allowed to flow for sufficient time to purge the gauge glass from previous samples and then to shut off the flow, trapping in the glass a typical sample of the mixture undergoing the reaction and permitting this sample to settle, so that the acid and the hydrocarbon separates. The relative volumes of the acid layer and the hydrocarbon layer then show the acid-hydrocarbon ratio in the reaction mixture. However, because of the fact that the mixture is either in the form of an emulsion or an intimate mixture of the two phases, the time required for settling, to permit accurate determination of the ratios, is usually considerable. It varies with the degree of the mixing, with the ratio of acid to hydrocarbon, and perhaps with other factors; but is usually one hour or longer and may be as much as two hours or more.

In accordance with the present invention, an improved gauge assembly is provided which permits an almost instantaneous determination of the ratio of hydrocarbon to acid, as its principle of operation is such that separation of the acid-hydrocarbon mixture into separate layers is unnecessary for the determination of this ratio. In principle, the new gauge involves the balancing of the mixture of acid and hydrocarbon, the ratio of which is to be determined, against a body of equal vertical length consisting of two layers, a lower acid layer and an upper hydrocarbon layer, usually obtained by permitting a previously taken sample of the reaction mixture to settle.

The new gauge involves the use of a vertical gauge glass connected at the top and bottom with a parallel (sampling) leg of equal length at the same elevation. The glass, and the parallel leg, are suitably connected to the container or reaction vessel by lines equipped with valves which permit the reaction mixture to flow through either the gauge glass, or the parallel leg, or both, or permit the flow to be shut off from either or both. Thus a typical sample of the mixture may be introduced into the gauge glass, and the connection between this glass and the reaction vessel closed, so that this mixture settles into two layers, an acid layer and a hydrocarbon layer. Subsequently, when it is desired to determine the ratio of the material within the reaction vessel, it is simply necessary to permit some of the mixture to flow through the parallel leg, close the valve which permits this flow and open the valve which provides communication between the parallel leg and the gauge glass. If the ratio of acid to hydrocarbon in the reaction vessel, i. e., in the sample in the parallel leg, is the same as that in the mixture originally introduced into the gauge glass, the interface between the two layers will not move. On the other hand, if the mixture in the parallel leg, that is, in the reaction vessel, contains more acid, and hence has a greater density, the interface will move upwardly, while if it contains more hydrocarbon, and hence has a lower density, the interface will move downwardly, flow from the gauge glass to the parallel leg taking place, until the head of liquid in the parallel leg and the gauge glass is the same.

The gauge glass can be suitably calibrated so that the ratio in the parallel leg which contains the samples of the reaction vessel may be read directly. However, it is advantageous to avoid too great changes in the level in the gauge glass upon taking a sample and balancing it against the liquid in the gauge glass, and if the interface level (indicating ratio) changes more than about 5% when taking a reading, it is desirable to take another sample, or additional samples, until the change is less than about 5%.

Various gauge assemblies embodying the foregoing principle, and permitting the rapid accurate determination of the acid-hydrocarbon ratio may be used. Two suitable assemblies are illustrated, in diagrammatic fashion, in the appended drawing.

In Fig. 1 there is illustrated a suitable assembly comprising a gauge glass 10, a parallel leg 12 and connections to the reaction vessel 14 and 16. Both the gauge glass and the parallel leg are attached to the line 14 at the top and to the line 16 at the bottom, flow to the gauge glass being controlled by the valves 18 and 20 and to the parallel leg by the three-way two-port cock 22. The gauge glass is connected at the top to the line 26, which is connected to the parallel leg 12 somewhat below the top, as illustrated. This line is open, and enters the parallel leg below the top to provide a hydrocarbon trap which prevents the carrying over of emulsion into the gauge glass when the mixture from the reaction vessel is flowing through the parallel leg but not through the gauge glass.

When there is no flow of liquid through the gauge glass 10 and therefore no flow through line 26, hydrocarbon and acid will separate in the relatively short vertical component of line 26 just as they do in the gauge glass 10 and the upper hydrocarbon layer will fill the relatively short top horizontal portion of line 26. The separated hydrocarbon thus entrapped will not pass downwardly in the vertical component of line 26 through a heavier liquid so long as there is no flow of liquid through gauge glass 10 irrespective of whether or not there is flow through parallel leg 12. When in making a determination the interface moves downwardly in gauge glass 10, such movement must be accompanied by a flow of liquid into the upper end of gauge glass 10 but the material which enters the gauge glass 10 under these conditions is the separated hydrocarbon trapped in the upper horizontal portion of line 26 rather than the emulsion from parallel leg 12.

In operation, the gauge glass is charged with an acid-hydrocarbon mixture, for example, by taking a sample from the reaction vessel, or in other ways, and is allowed to settle. Once this settled product is obtained in the gauge glass, the ratio in the reaction vessel, at any subsequent time, may be read directly by closing the port in the cock 22, which permits flow through the parallel leg and opening the port which connects the gauge glass to the parallel leg at the bottom. Liquid will then flow from one leg to the other until the hydrostatic head in each is the same. The position of the interface in the gauge glass will then indicate directly the ratio of acid to hydrocarbon in the parallel leg, i. e., in the reaction vessel. The precautions referred to above, if the level in the gauge glass changes too much, should be observed to provide accurate determination. To minimize the errors introduced by changing levels or ratio of acid to hydrocarbon in the reaction vessel, it is advantageous to design the gauge glass with a considerably smaller cross-sectional area than the corresponding parallel leg.

A modified assembly, which has some advantages over that described in connection with Fig. 1, is illustrated in Fig. 2. In this assembly, there are provided two gauge glasses 30 and 30' in parallel with the sampling leg 32. Upper connections 34 connect the upper ends of the gauge glasses 30 and 30' with the upper portion of the sampling leg 32 with which they communicate below the top to provide a hydrocarbon trap which prevents the carrying over of emulsion into a gauge glass when the mixture from the reaction vessel is flowing through the parallel leg but not through a gauge glass. Valves 40 and 40' are provided to permit or prevent liquid flow through either branch or both branches of line 34 as desired. Similarly, lower connections 36 connect the lower ends of gauge glasses 30 and 30' with the lower portion of sampling leg 32 with which they communicate at a point above the bottom to provide an acid trap which prevents the carrying over of emulsion into a gauge glass when the mixture from the reaction vessel is flowing through the sampling leg but not through a gauge glass. Valves 41 and 41' are provided to permit or prevent liquid flow through either branch of line 36 as desired. The gauge glasses 30 and 30' and sampling leg 32 communicate at their upper ends with an upper exterior connection 42 and at their lower ends with a lower exterior connection 43. The upper and lower exterior connections 42 and 43 perform the function performed by connections 14 and 16, respectively, in the arrangement illustrated in Fig. 1. Valves 44 and 45 are provided to permit or prevent the flow of fluid through exterior connections 42 or 43 or both as desired. Valve 38 is positioned in sampling leg 32 to permit or prevent flow through the sampling leg 32. The functions performed by the three-way valve 22 in the assembly of Fig. 1 may be performed by the simple valves 38, 41 and 45, collectively, with respect to gauge glass 30 and sampling leg 32, and by valves 38, 41' and 45, collectively, with respect to gauge glass 30' and sampling leg 32. It will be apparent that each of the traps 34 functions in the same general manner as the trap 26 in the arrangement illustrated in Fig. 1, while traps 36 function similarly except that the separations which occur in the vertical components of traps 36 entrap separated acid in their lowermost horizontal components so that if the interface in either of glases 30 and 30' moves upwardly, settled acid will flow into that ratio glass rather than emulsion. Operation of this assembly is otherwise similar to that described in connection with Fig. 1.

I claim:

1. A device for determining the relative proportions of two immiscible liquids in admixture or emulsified form, comprising a vertical gauge glass, a sampling leg in parallel therewith and connected thereto at the top and bottom by upper and lower connections respectively at least one of said connections being arranged to form a trap, exterior connections communicating respectively with said upper and lower connections and arranged to convey the mixture, the relative proportions of which are to be determined, into and from said sampling leg, valve means arranged to co-operate with said lower connection and with the exterior connection communicating with the lower end of said sampling leg to permit free and open communication at one time between the exterior connection communicating with the lower end of said sampling leg and said sampling leg only, or between said sampling leg and said gauge glass only, or between the exterior connection communicating with the lower end of said sampling leg and said gauge glass.

2. A device as in claim 1, in which the connection between the top of the gauge glass and the sampling leg forms a trap.

3. A device as in claim 1, in which the connection between the bottom of the gauge glass and the sampling leg forms a trap.

4. A device as in claim 1, provided with a second gauge glass in parallel with the sampling leg and similarly connected thereto at the top and bottom.

WILLIAM MENDIUS.